Figures 1, 2:
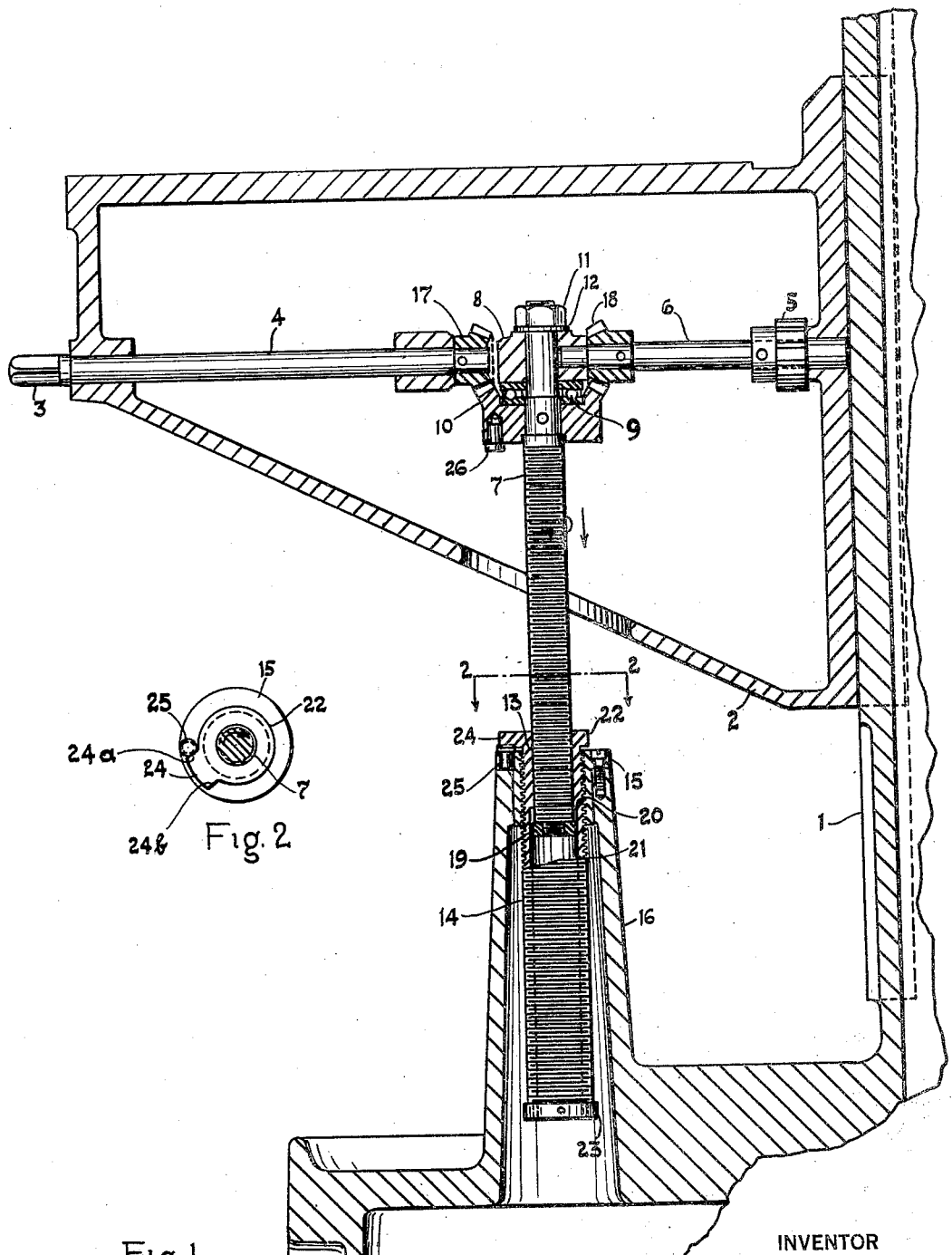

Nov. 8, 1932.　　　T. TRECKER　　　1,886,851

TELESCOPIC SCREW

Filed May 24, 1928

INVENTOR
Theodore Trecker
BY
Fred G. Parsons
ATTORNEY

Patented Nov. 8, 1932

1,886,851

UNITED STATES PATENT OFFICE

THEODORE TRECKER, OF MILWAUKEE, WISCONSIN, ASSIGNOR TO KEARNEY & TRECKER CORPORATION, OF WEST ALLIS, WISCONSIN

TELESCOPIC SCREW

Application filed May 24, 1928. Serial No. 280,166.

This invention relates to an improved construction for telescopic screws, particularly for use in machine tools.

A purpose is to prevent the tight seating of shoulders or abutments required for limiting the relative axial movement of different portions of such screws.

A further purpose is generally to simplify and improve the construction and operation of such screws, and still other purposes will be apparent from this specification.

The invention consists in the arrangement and combination of parts herein illustrated, described and claimed and in such modifications of the structure illustrated as may be the equivalent of the structure claimed.

In the drawing, Fig. 1 is a vertical section through a telescopic screw in which the invention is incorporated, the screw being here shown associated with the knee and column of a milling machine for the purpose of relative vertical movement therebetween.

Fig. 2 is a horizontal section along line 2—2 of Fig. 1.

The machine column 1, of which only a portion is shown is provided with suitable slides for guiding a knee 2 for vertical movement. Such movement is brought about by means of a hand crank (not shown) applied to the squared end 3 of a shaft 4 or by power applied to a gear 5 fixed on a shaft 6.

An inner screw 7 is journaled in a bearing 8 fixed with the knee and is prevented from axial movement relative thereto by means including for the one direction a thrust bearing 9 positioned between suitable shoulders or abutments respectively on a bevel gear 10 and bearing 8, and for the other direction a nut 11 threaded on the end of the screw to retain a thrust washer 12 which seats against an abutment at the other end of bearing 8.

The inner screw portion 7 is in threaded engagement with an axial bore 13 forming a nut in an outer screw portion 14, which in turn is in threaded engagement with a nut 15 fixed in an upwardly extended stump 16 fixed on the base of column 1.

The mechanism just described constitutes a telescopic screw arrangement commonly used for the movement of milling machine knees, where the nature of the machine is such that plain screws giving sufficient range of movement would, at certain points of their movement project below the lower plane of the column base.

The bevel gear 10 and screws 7 and 14 are moved from shaft 4 by the means of a bevel gear 17 fixed on shaft 4 and engaging gear 10; and are moved from shaft 6 by the means of a bevel gear 18 engaging gear 10.

The power mechanism (not shown) for movement of gear 5 ordinarily includes a slow or feed transmission and a fast transmission for quick knee movement.

At the end of screw 7 is fixed a collar 19 which will at times strike or seat against a shoulder 20 in the enlarged bore 21 through which the collar moves. The one end of screw 14 has a head portion 22 fixed thereon which, unless prevented, will at times strike or seat against the upper face of nut 15 and at other times against the lower face of bevel gear 10. The other end of screw 14 has fixed thereon a collar 23 which will at times strike against the lower face of nut 15.

Some such construction is necessary in an extensible screw, in order that the different screw members thereof may each be forced at some point of the travel to take up a rotational and axial movement before the other screw member disengages from its nut, but the construction thus far described unless modified has disadvantages or objections in that, when a screw is provided with a collar or head which is forced by the screw rotation to seat against the end of the nut, a wedging action takes place owing to the relatively small angle of the screw thread and in a telescopic screw, where different shoulders or collars operate alternately in different directions of movement of the parts the force of such wedging action may be cumulative as follows:

During a first movement in one direction, a given shoulder wedges moderately, during a first reverse movement, an opposite shoulder also wedges moderately. Such forces are moderate because the only work performed is to start the other screw member against ordinary screw friction and inertia. But on the next succeeding travel in each direction, such work is increased by the amount necessary to release the wedged shoulder of the other screw, which causes the wedging action to be greater than on the previous travel and so on, until under certain conditions the threads may be damaged or the collars forced off.

Such objectionable cumulative result is completely prevented in the present machine by the following construction. The head 22 of screw 14 is provided with a peripheral projection or lug 24, the opposite faces 24a and 24b of which form abutments. The screws shown have right hand thread, whereby abutment 24a is contacted at the lower point of the travel of screw 14 by a lug or abutment 25 fixed with nut 15, and abutment 24b is contacted at the lower point of the relative movement of screw 7 by a lug or abutment 26 fixed with gear 10. In each instance, the relationship of the parts is such that as the lug 24 approaches the one or the other of lugs 25—26, lug 24 will at a certain revolution barely clear the top of the other lug but at the next succeeding revolution will have advanced axially sufficiently to give a substantial bearing against the face 24a or 24b.

When such lug contact occurs the relative rotation and hence the relative axial movement of head 22 is checked and the end faces thereof never seat. It is obvious that no wedging action such as mentioned above can be set up by stops which act directly against the rotational movement instead of the axial movement, and since all the stops contacted during downward movement of the knee, that is to say in the one direction of screw movement, are non-wedging, the cumulative result mentioned above can never occur.

It is contemplated and obviously practicable to apply similar non-wedging stops, when necessary, to both directions of screw movement.

What is claimed:

1. In a machine tool having relatively movable supports and a telescopic screw for movement of said supports, said screw having co-axial inner and outer relatively rotatable and axially movable members, the combination of a first stop for limiting the axial movement of one of said members relative to the other, and a second stop for limiting the axial movement of said other member relative to one of said supports, each of said stops including contact portions relatively rotatable into a position of mutually opposed thrust transverse to the axis of rotation, whereby to avoid substantially all thrust between the stop portions in the direction of said axis.

2. In a machine tool having relatively reciprocatory supports and a telescopic screw for movement of said supports, said screw having co-axial inner and outer relatively rotatable and axially movable members, the combination of a plurality of stops collectively defining the limits of axial movement of both said members in one direction of support movement, each of said stops including contact portions relatively rotatable into a position of mutually opposed thrust transverse to the axis of rotation, whereby to substantially avoid axial thrust between any stop portions during at least one direction of support movement.

3. In a milling machine the combination of a column having a base portion, a knee guided on said column for vertical movement, a first screw journaled in said knee and axially movable therewith, a second screw having a threaded bore engaging said first screw, a nut fixed with said column base portion and engaging said second screw, means associated with said knee for rotation of said first screw, and means for rotation of said second screw including contact members respectively associated with the different screws, one of said members being rotatable with said first screw to thrust against the other of said members in a direction transverse to the axis of rotation whereby to substantially avoid thrust between said members in the direction of said axis.

THEODORE TRECKER.